June 29, 1937.                R. GÜNZEL                2,085,358
               TIN WITH A JAMMING SLIP-ON COVER
                    Filed July 30, 1934
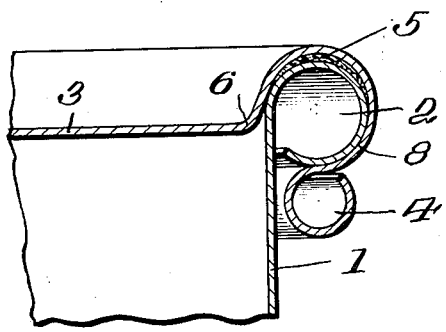
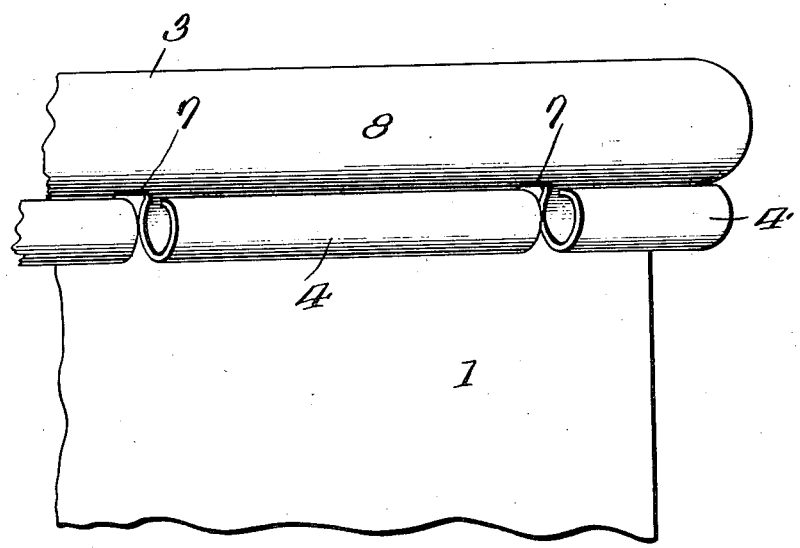
Inventor
Rudolf Günzel Patented June 29, 1937

2,085,358

UNITED STATES PATENT OFFICE 2,085,358

TIN WITH A JAMMING SLIP-ON COVER

Rudolf Günzel, Hamburg, Germany, assignor to Wilhelm Valentin Sippell, The Hague, Netherlands Application July 30, 1934, Serial No. 737,663
In Germany August 2, 1933

1 Claim. (Cl. 220—59)

The present invention relates to removable covers for tin cans. The essence of the invention resides in the provision of a removable cover for a tin can, which closes the can more efficiently than known covers.

The chief drawback of known removable covers is the fact that they cannot be used on cans destined to contain perishable food products or products which are preferably cooked in cans. In such cases the covers have usually been soldered to the can, this being the best known way of providing an air and watertight can. The present invention consists in the provision of a cover which will grip the upper rim of the can so tightly that leakage is absolutely prevented, even when internal pressure occurs as the result of the application of heat during cooking or boiling.

Thus, it will be seen that one of the objects of the invention is to obviate the necessity for the employment of soldering apparatus in assembling the can and the cover.

Another object of the invention is to provide a cover which can be removed quite simply and without the employment of the conventional cutting types of can-openers. When such can-openers are used, there is great danger to the operator, and wounds are common occurrences. If the top of the can has been allowed to become dirty, there is the added danger of infection.

To avoid such disadvantages, a can according to the present invention is provided with an outwardly extending bead or rim on its upper edge. The cover member comprises a horizontal depressed portion designed to be embraced within the circumference of the can, and a rim portion having the shape of a reversed S. The upper loop of the reversed S embraces the bead on the can continuously throughout its area. The lower loop of the reversed S is adapted to be pressed by a suitable tool in against the shank of the can. To permit proper manipulation of the lower loop, a plurality of small cuts are located therein, said cuts being substantially smaller in width than the distance between the cuts.

These and other features of the invention will be best understood and appreciated from the following description of a preferred embodiment thereof as illustrated in the accompanying drawing, in which:

Fig. 1 is a lateral cross-section of a can and cover, sections of both members being cut away, and Fig. 2 is a view in perspective of a fragment of a can with its cover placed thereon.

As shown in Fig. 1, the can 1 is provided with a bead 2 on its upper edge. The closure 3 comprises a flat, depressed section 6, which is dimensioned to fit within the walls of the can 1. Integral with the depressed section 6 of the closure 3 is a rim 8 which has a bead 4 at its lower edge.

Spaced along the bead 4 is a series of small cuts 7. As shown in Fig. 2, the cuts 7 are spaced a considerable distance apart, with the result that the bead 4 is not greatly weakened.

When the cover 3 is to be applied to the can 1, a packing 5 of rubber is placed on top of the bead 2. The function of the packing 5 is conventional and aids in effecting absolute closing of the can.

The next step is to fit the cover 3 on the can 1, it being understood that the rim 8 and the bead 4 are not at that time in close contact with either the bead 2 or the shank of the can 1. When the cover 3 has been fitted on the can 1, the rim 8 and the bead 4 are rolled inwardly against the bead 2 and the shank of the can 1. This rolling operation may be carried out by any appropriate tool and does not form a part of the present invention. After the rolling operation has been performed, inspection will show that the rim 8 is in contact with the bead 2, or the packing 5 continuously around the can. This appears clearly in Fig. 1. Over one half of the outer periphery of the bead 2 is closely embraced by the rim 8.

The rolling operation also serves to press the bead 4 in towards the side walls of the can 1 and underneath the rim 8. Thus, the rim 8 and the bead 4 are given the configuration of a reversed S.

The function of the cuts 7 now becomes clear. If the cuts 7 were not provided in the bead 4, compression of the bead around the shank of the can would result in the formation of small pleats, since the circumference of the bead is substantially reduced during the rolling operation. The cuts 7 provide free areas which can take up this reduction.

When it is desired to remove the cover 3 from the can 1, the sections of the bead 4 between the cuts 7 can be pried outwardly, releasing somewhat the tight embrace of the bead 4 around the can and allowing facile removal of the cover 3.

It is important to note that the cuts 7 are confined to the bead 4. If the cuts 7 extended upwardly into the area of the rim 8, the closed can would not be air and watertight. This would be especially true if internal pressure was built up during a cooking process. The entire purpose of the present invention would then be nullified.

This invention is not confined to circular cans but can be successfully applied to cans of all shapes.

It is understood that the invention and many of its attendant advantages will be understood from the foregoing description, and it is apparent that various changes may be made in the form, construction, and arrangement of the parts without departing from the spirit and scope of the invention, the form hereinbefore described being merely a preferred embodiment thereof.

What I claim is:

A metal container having an outwardly extending bead at its open end, a removable closure for the open end of said container, comprising a medial depressed portion, an outwardly extending peripheral beaded rim, said rim being continuous throughout its area and extending a sufficient distance to securely hold said cover in place, and an inwardly extending bead formed on the lower edge of said rim and disposed in close proximity to the body of said container immediately below the bead thereon, said inwardly extending bead being provided substantially entirely within its confines with a plurality of cuts of small width, compared to their distance apart, which cuts are confined to the bead, to give resiliency to said inwardly extending bead whereby the latter engages the closure tightly but yieldingly about the bead on the container.

RUDOLF GÜNZEL.